United States Patent [19]

Beardsley et al.

[11] 4,038,807

[45] Aug. 2, 1977

[54] APPARATUS FOR PACKAGING AND THE LIKE

[75] Inventors: Paul G. Beardsley, Gobles; Albert W. Patzlaff, Holland, both of Mich.

[73] Assignee: Blueberry Equipment, Inc., South Haven, Mich.

[21] Appl. No.: 623,463

[22] Filed: Oct. 17, 1975

[51] Int. Cl.² .......................... B65B 1/06; B65B 7/28
[52] U.S. Cl. ...................................... 53/282; 53/307; 53/329
[58] Field of Search .................. 53/282, 287, 306, 307, 53/329; 221/221

[56] References Cited

U.S. PATENT DOCUMENTS

| | | | |
|---|---|---|---|
| 1,666,008 | 4/1928 | Graffenberger | 221/221 |
| 2,595,849 | 5/1952 | Hammond | 53/306 |
| 3,099,115 | 7/1963 | McKibbon et al. | 53/282 X |

*Primary Examiner*—Robert Louis Spruill
*Attorney, Agent, or Firm*—Price, Heneveld, Huizenga & Cooper

[57] ABSTRACT

A berry packaging apparatus including a denesting subassembly, a produce or berry dispenser, a cover pick-up and applicator subassembly, and a conveyor for transporting a plurality of corner-slotted containers. The denesting subassembly employs a plurality of opposed, shaped fingers to separate the lowermost container of a stack and deposit same onto the conveyor. The containers are filled with produce at the dispenser. The cover pick-up and applicator picks up a flexible film wrapper or cover and wipes the cover down around the container periphery.

16 Claims, 12 Drawing Figures

APPARATUS FOR PACKAGING AND THE LIKE

BACKGROUND OF THE INVENTION

This invention relates to berry packaging apparatus and more particularly it concerns apparatus for filling and covering, in a semi-automatic fashion, berry boxes of the type having vertical slots on opposite sides thereof.

In the past, the filling of berry boxes with blueberries or the like prior to sale or shipment has generally been a totally manual operation. Typically, the berries are poured into the boxes and a flexible wrapper is wiped down around the berries and the box periphery. This wiping operation is performed either wholly by hand or with a hand manipulated rectangular wiper. The wrapper is then held in place by a rubber band or the like.

As is readily apparent, this operation is generally time-consuming and does not result in significant production rates. Further, increased labor costs as well as the difficulty in obtaining sufficient competent help have generally led to an increase in the retail price of the berries.

Another disadvantage with the manual packaging of berry-type products involves the difficulty associated with the separation of the berry boxes. The boxes, which are generally polygonal in shape, come from the manufacturer in a stacked condition. The boxes are nested together and at times it is extremely difficult to separate the individual boxes. This situation further aggravates the above mentioned production rate problems. Also, this denesting problem at times results in unseparated boxes being filled with berries and covered with a flexible wrapper. This waste of packaging material also results in increased production costs.

SUMMARY OF THE INVENTION

In accordance with the present invention, unique apparatus is provided for destacking, filling and covering containers, particularly polygonal containers used for produce such as berries. Essentially, the apparatus includes a denesting subassembly having a magazine for supporting a plurality of nested or stacked containers. Each container includes a plurality of conventional, vertical slots formed in opposite sides of the container. A plurality of oppositely disposed, special slot-penetrating fingers ae mounted on the denesting subassembly. The fingers are adapted to be moved towards the stack of containers into the slots, and to wedge the bottom container away from the remainder of the stack and then depress it out of the magazine onto a conveyor.

The container is then transported by the conveyor subassembly to a filling station or dispenser where each container is filled with produce. Following the filling operation, each container is individually transferred by the conveyor to a semi-automatic covering subassembly. The covering subassembly includes a frame structure from which is pivotally supported a flexible wrapper retriever and wiper element. The retriever and wiper element is movable relative to the frame structure from a stack of flexible wrappers or covers to a position over a filled container and then downwardly toward the container to perform the wiping operation. Once the wrapper is wiped around the berries and the periphery of the container, a retainer such as a rubber band or the like is manually positioned to hold the wrapper in place.

A pneumatic control system including a manually operated foot switch is provided for sequentially activating the denester subassembly and the semi-automatic covering subassembly.

Among the objects of the present invention therefore are: the provision of a produce packaging apparatus capable of destacking produce boxes, filling the boxes with produce such as berries, and attaching a flexible wrapper over the produce and around the container periphery; the provision of a packaging apparatus including a destacking subassembly for separating containers having vertical slots in opposite sides thereof from the bottom of the stack; the provision of a destacking subassembly employing special penetrating fingers movable into the vertical slots of the containers and serving to wedge the bottom container away from the remainder of the stack and then depress it out of a magazine onto a conveyor; the provision of a produce packaging apparatus including a semi-automatic covering subassembly capable of placing a flexible wrapper on a filled box of berries or the like; and the provision of a semiautomatic covering subassembly capable of retrieving a flexible wrapper, placing it on a fille container, and wiping it down around the produce and the container periphery ready for banding.

DETAILED DESCRIPTION OF THE PREFERRED EMBODIMENT

Figure 1:
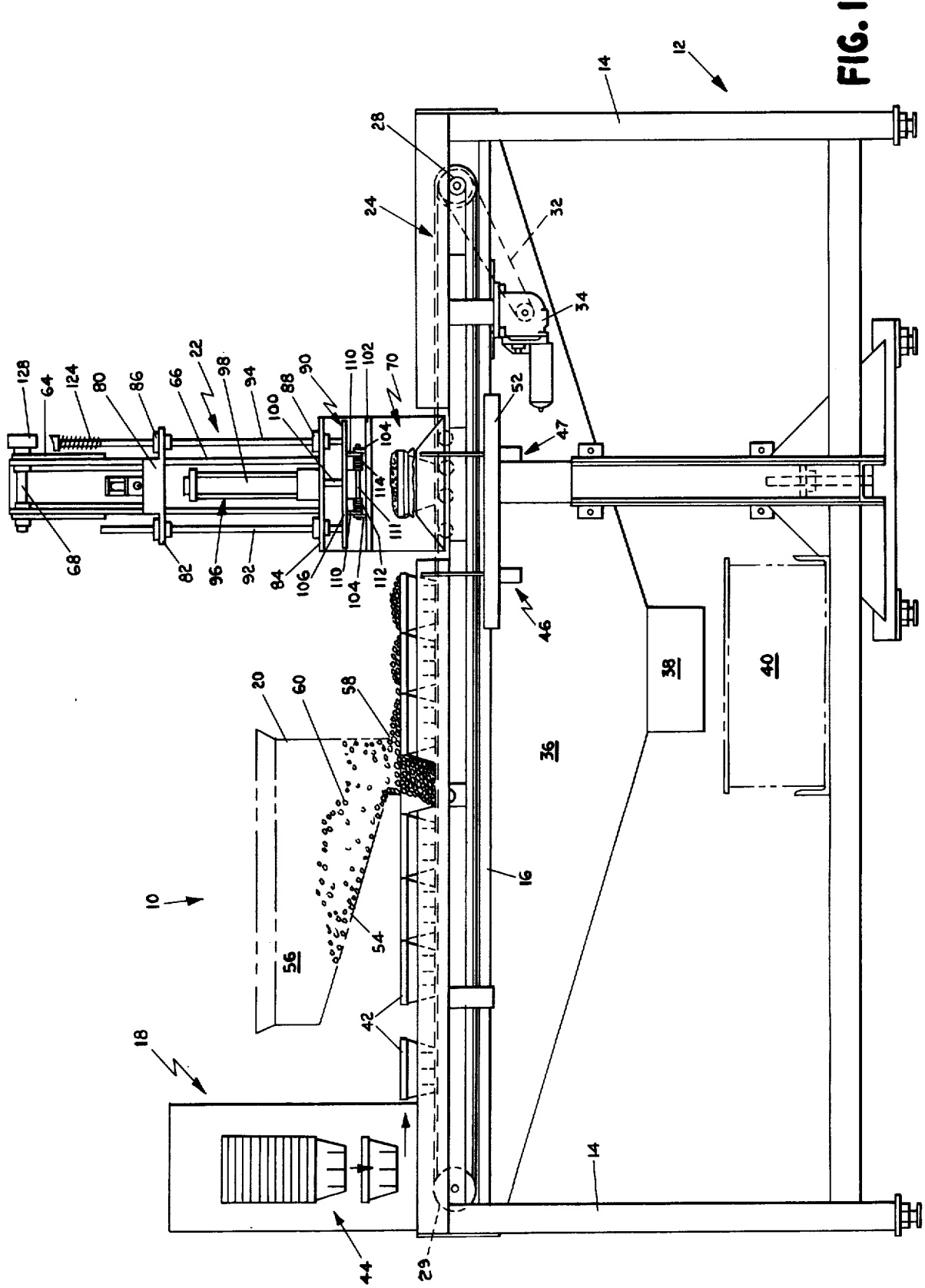
FIG. 1 is a front elevational view of a produce packaging apparatus in accordance with the present invention.

With reference to the drawings, FIG.1 illustrates the overall produce packaging apparatus, generally designated 10. As shown, the apparatus 10 includes a main frame assembly 12. The main frame 12 includes upstanding legs 14 and longitudinally extending, upper support members 16. Directly attached to upper support members 16 are the various subassemblies of the apparatus. A denester subassembly 18, schematically illustrated in FIG. 1, is supported on one end of main frame 12. A loading hopper 20 is supported on main frame 12 intermediate the ends thereof and a semiautomatic covering subassembly 22 is supported on main frame 12 downstream of the loading hopper 20.

Figure 2:
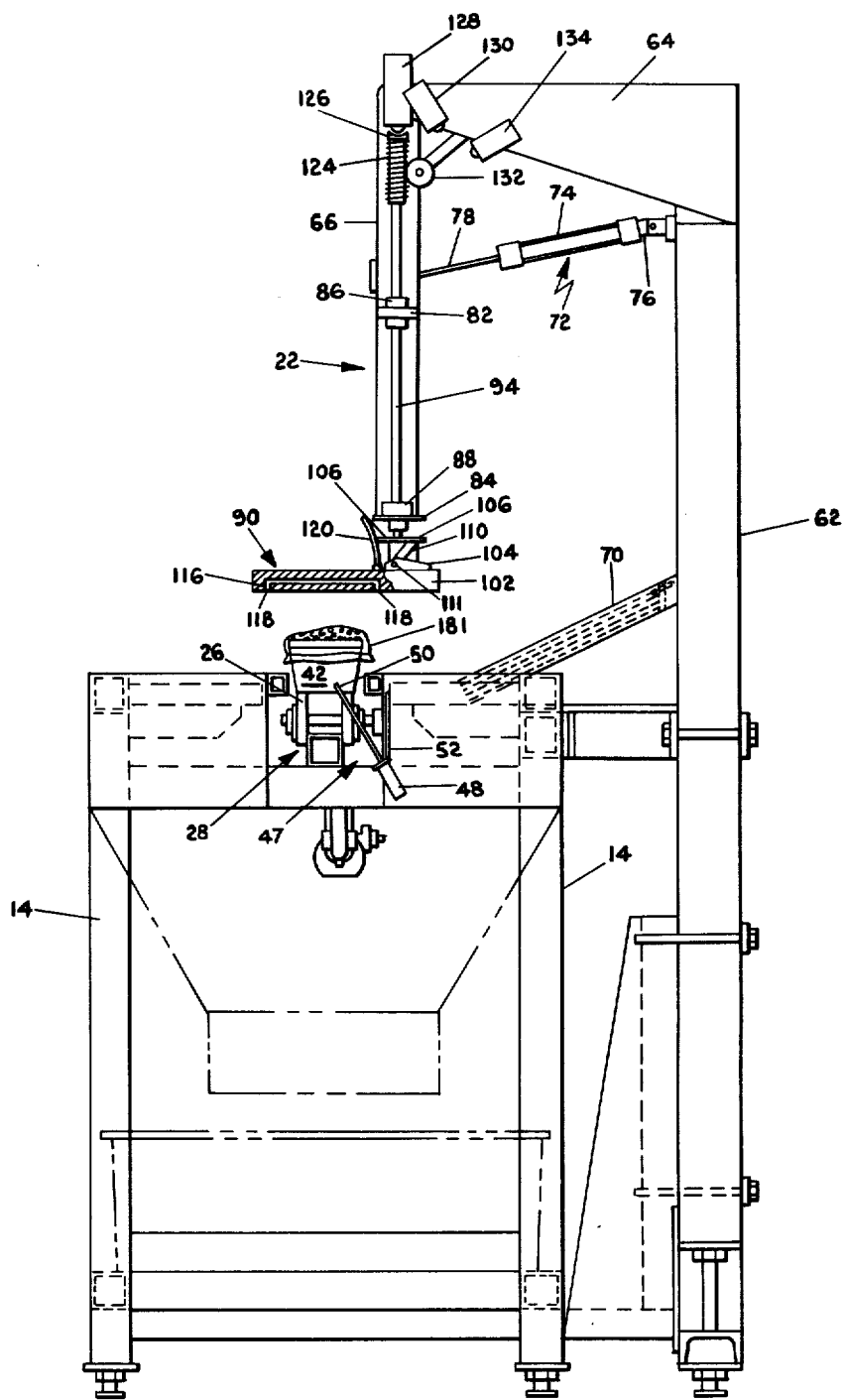
FIG. 2 is a side elevational view of the produce packaging apparatus of FIG. 1.

As best seen in FIGS. 1 and 2, a conveyor 24 or container support extends the length of main frame 12. The conveyor 24 includes a pair of endless belts 26 extending around a pair of pulley assemblies 28 and 29. The pulley assemblies 28 and 29 and therefore endless belts 26 are rotated by a drive belt 32. The drive belt 32 is in turn driven by a suitable motor 34 supported on main frame 12. The motor may be of electric, pneumatic, or hydraulic type. A collecting or overflow chute 36 is supported by main frame 12 below conveyor 24. The overflow chute 36 is generally frusto-conical in shape and terminates at its lower portion in a discharge tube 38. A collecting bin 40 is positioned on frame 12 directly below discharge tube 38. The overflow chute 36 functions to collect berries or other produce in bin 40 which overflow or are otherwise dropped during the packaging process.

As seen in FIGS. 1 and 2, a plurality of berry boxes or produce containers 42 are transported by and positioned on conveyor 24. Each box is automatically removed from the bottom of a stack of containers 44 by denesting apparatus 18 as will be more fully described below. The conveyor 24 is constantly in operation during the use of the packaging apparatus. In order to retain containers 42 in their proper position during the operation of the apparatus, a pair of stop mechanisms 46 and 47 are provided. The stop mechanisms 46 and 47 are illustrated as piston and cylinder assemblies including a cylinder 48 and a piston rod 50. The stop mechanisms 46 and 47 are supported by an angled bracket 52 which in turn is secured to main frame 12. The stop mechanisms 46 and 47 are automatically operated in timed relationship to the operation of covering subassembly 22, denester subassembly 18 and conveyor system 24, so that a filled container is always presented at covering subassembly 22 at the proper time. Further, stop assembly 46 retains the line of boxes 42 under the loading hopper 20 to insure proper filling of the boxes with produce.

As shown, loading hopper 20 is of gravity feed type including an angled bottom 54 and upstanding walls 56. At the apex of bottom 54 and walls 56 a discharge opening 58 is provided. As is readily apparent from FIG. 1, the produce or berries 60 placed within hopper 20 flow by gravity through discharge opening 58 into waiting containers 42 disposed on conveyor 24 below discharge opening 58.

As best seen in FIGS. 1 and 2, semi-automatic covering subassembly 22 includes a vertically extending support 62 and a horizontally extending, yoke-like support 64. Pivotally attached to the end of yoke support 64 is a U-shaped member 66. The U-shaped member 66 is pivoted to support 64 by a shaft 68. Adjacent vertical support 62 is a wrapper retainer box or holder 70. The retainer box 70 is filled with a supply of flexible wrappers or covers 181. The U-shaped support 66 is pivoted from a covering position over a filled box 42 to a wrapper or cover pick-up position over the retainer box 70 by a piston and cylinder assembly 72. The piston and cylinder assembly 72 includes a cylinder 74 pivotally connected at one end 76 to vertical support 62. A piston rod 78 extending from assembly 72 is likewise pivotally connected to a cross piece 80 secured to U-shaped support 66.

The U-shaped support 66 includes an upper guide plate 82 and a lower guide plate 84. Each guide plate includes a pair of plain bearings 86 and 88. A rectangular wiper assembly generally designated 90 is slidably supported by guide plates 82 and 84 of support 66 by a pair of guide rods 92 and 94. The guide rods 92 and 94 pass upwardly from the rectangular wiper or applicator assembly 90 through plain bearings 86 and 88. Vertical movement of wiper subassembly 90 is accomplished by a piston cylinder assembly 96. The cylinder 98 of assembly 96 is fixed to guide plate 84. A piston rod 100 of assembly 96 is connected to the wiper through an opening in guideplate assembly 84.

As shown, wiper assembly 90 includes a rectangular plate 102 having upstanding ears 104. The rectangular plate 102 is pivotally connected to a horizontally extending plate 106 having depending ears 110.

A shaft 111 extends through ears 104 and 108. A pair of coil springs 112 and 114 are positioned on shaft 110. Opposite ends of springs 112 and 114 are secured to plate 106 and rectangular wiper plate 102. As a result, plate 102 is biased to the horizontal position shown in FIG. 2, while still being capable of a limited clockwise rotational movement about shaft 110. As will be more fully described below, this limited pivotal movement serves to prevent injury to an operator during the operation of the covering subassembly and also serves to permit more efficient pick-up of the individual flexible wrappers retained within the box 70.

Rectangular wiper plate 102, as best seen in FIG. 2, is formed with a plurality of interior passages 116. Passages 116 terminate in openings 118 at the lower surface of plate 102. These openings are preferably positioned at opposite corners of plate 102. Passages 116 are connected to a source of vacuum (not shown) by a vacuum line 120. The suction serves to pick up each individual flexible wrapper from retaining box 70 and retain the wrapper to the underside of the wiper for transport over and down onto produce container 42.

Figure 7:
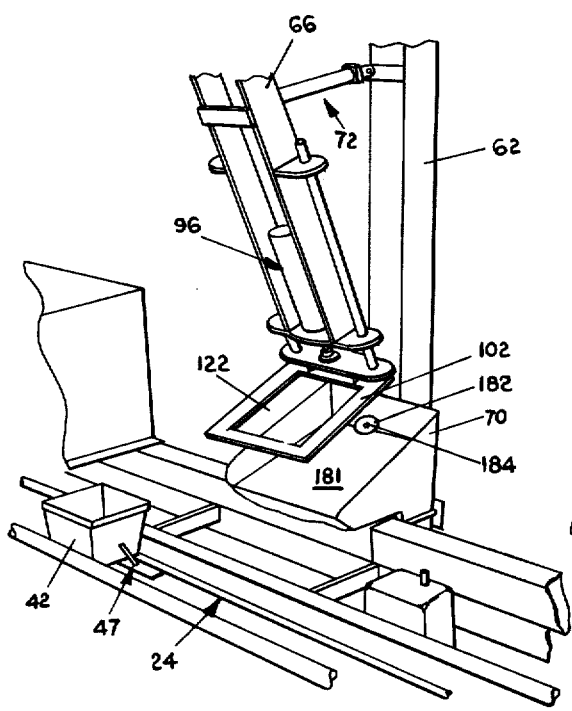
FIGS. 7-10 are perspective views illustrating successive steps of operation of the semi-automatic covering subassembly of the present invention.

As best shown in FIG. 7, rectangular wiper plate 102 is also formed with a centrally disposed, rectangular opening 122. Opening 122 is dimensioned so that plate 102 will pass down and around container 42 thereby wiping the flexible wrapper onto the produce and the container. I.e., the opening in the plate is larger than the container but the flexible wiper is slightly smaller to neatly wipe the wrapper down around the container periphery. In the alternative, the wiper plate 102 may take the form of two separate plates bolted, welded or otherwise suitably secured together. As shown in FIGS. 1 and 2, the guide rod 94 carries at its upper end a coil spring 124 to which is secured a block 126. Block126 is adapted to contact the plungers of pneumatic switches 128 and 130 mounted on yoke support 64. A guard 132 supported by yoke 64 serves to insure proper actuation of switches 128 and 130 by block 126 during the operation of the machine. Further, another pneumatic switch 134 is positioned on yoke 64 and is adapted to be actuated when support 66 is pivoted to the flexible wrapper pick-up position shown in FIG. 7.

Figure 4:
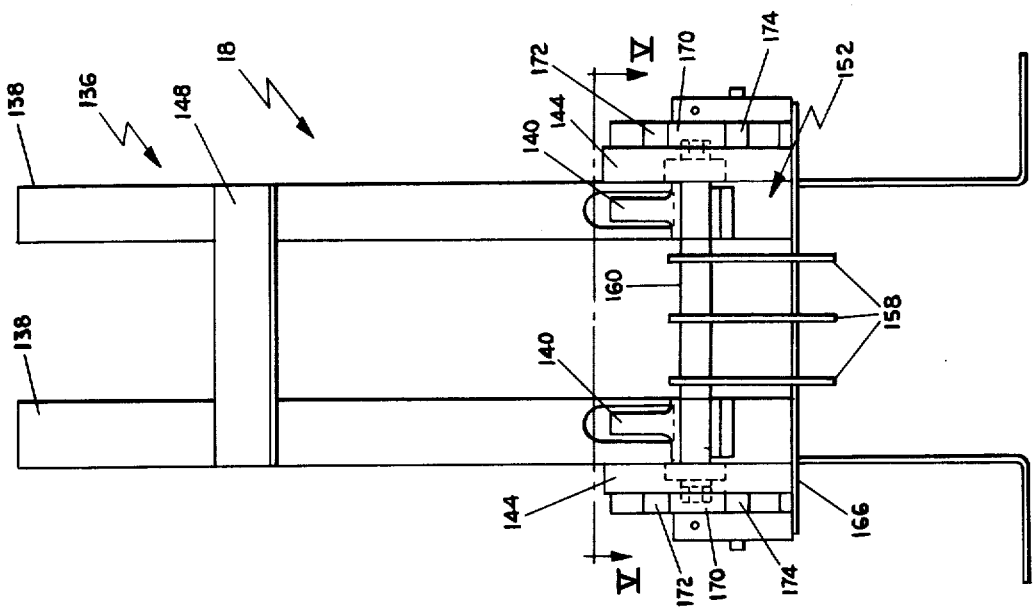
FIG. 4 is a side elevational view of the denesting subassembly of FIG. 3.
Figure 3:
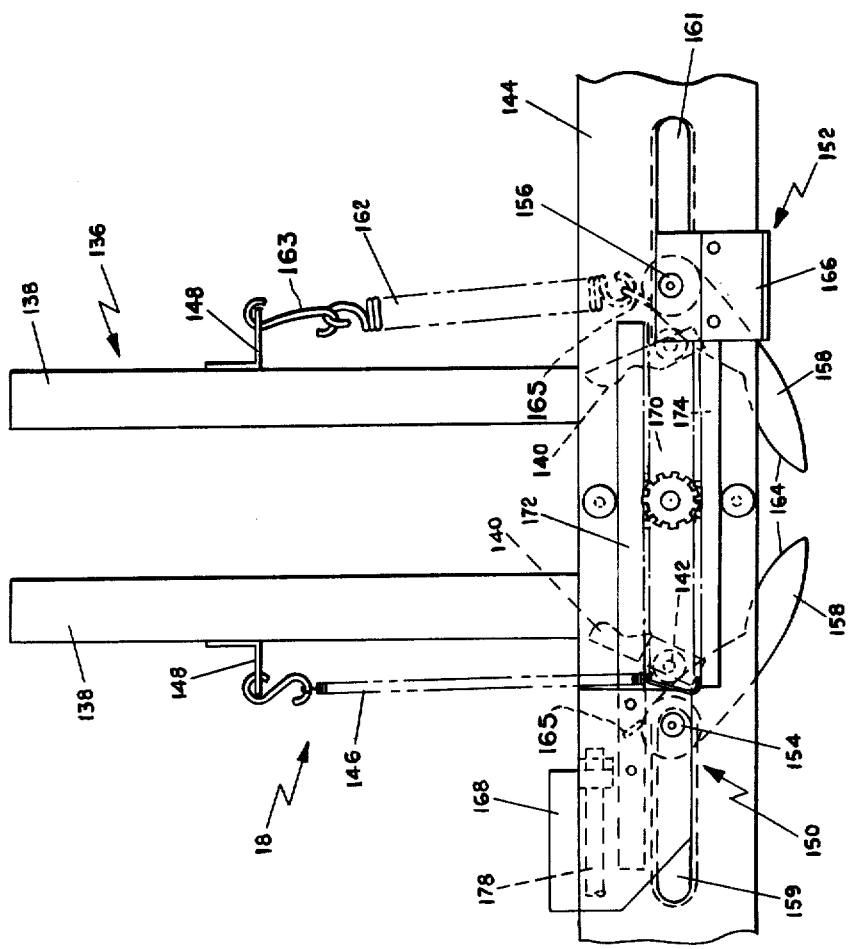
FIG. 3 is a fragmentary, front elevational view of a denesting subassembly of the apparatus of the present invention.
Figure 5:
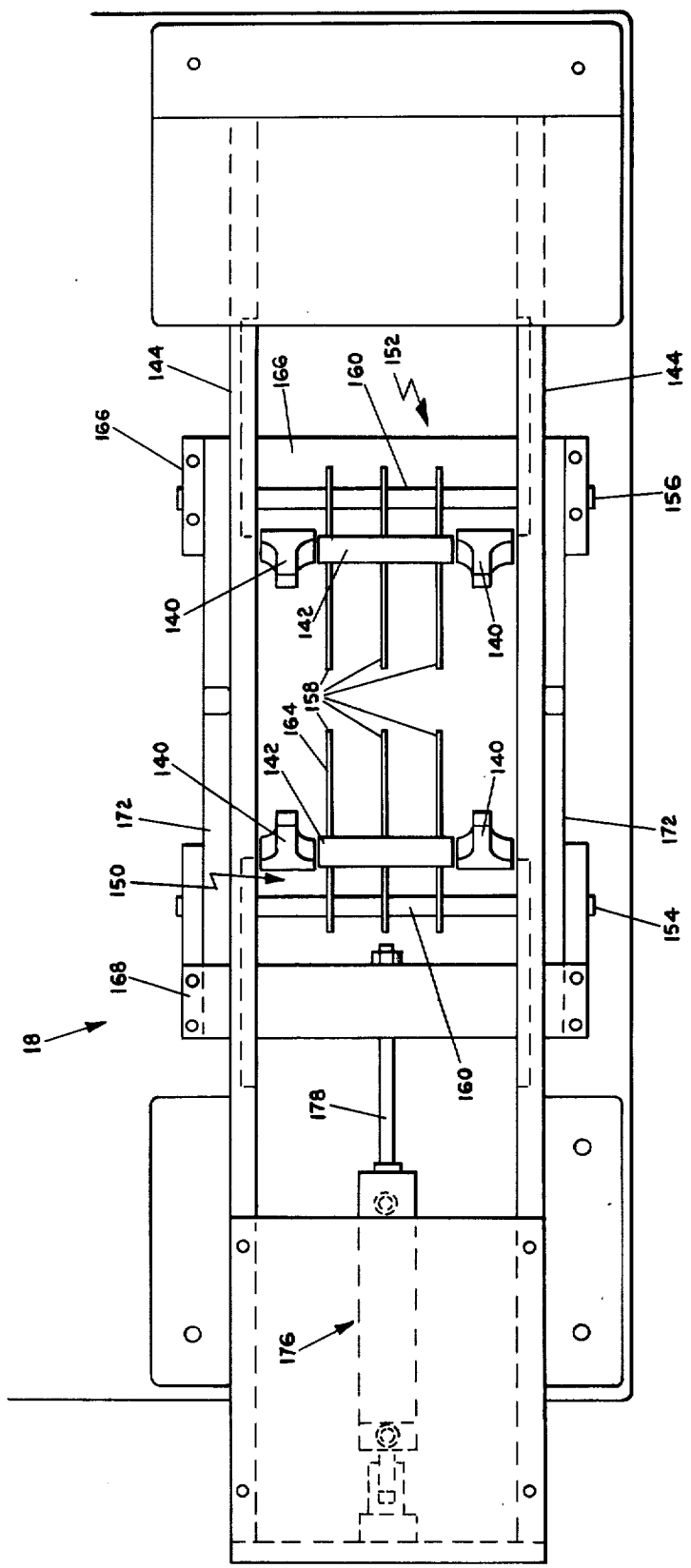
FIG. 5 is a plan view of the denesting subassembly of FIGS. 3 and 4.

With reference to FIGS. 3, 4 and 5, the denester subassembly 18 will now be more fully described. The denester 18 includes a magazine or stack retainer 136. Magazine 136 includes four upstandingcorner supports 138 dimensioned so as to retain stack 44 of container in an upright, vertical position. The run of the lowermost container of stack 44 will be engaged by four retaining lugs 140. The retaining lugs 140 are mounted for limited pivotal movement on shafts 142 which extend transversely between a pair of support plates 144.

Each lug 140 is biased to rotate inwardly by one of four springs 146 extending between the lower end of the lug 140 and an angle bracket 148 secured to the magazine 136. Only one of the four springs 146 and lug 140 combinations is illustrated in FIG. 3 in order to simplify the drawings. It should, of course, be understood, that a spring 146 is provided for each of the lugs 140. The actual denesting or separation of lowermost container 42 from stack 44 is accomplished by a pair of oppositely positioned, denesting finger assemblies 150 and 152. The assemblies include transversely extending shafts 154 and 156, respectively. The ends of each shaft ride within elongated slots 159 and formed in side plates 144 (FIG. 3). With each finger assembly 150, 152, a plurality of specially shaped fingers 158 are nonrotatably secured to a tube 160. The tube 160 and fingers 158 are in turn rotatably supported on each shaft 154 and 156. A single coil spring 162 extends from each finger-tube assembly to a corresponding angle bracket 148 to bias the fingers in an upward direction. The upper end of each spring 162 is secured to its respective bracket 148 by an S-shaped hook 163. The lower end of each spring 162 is attached to an eye 165 (FIG. 3 only) which in turn is secured to tube 161 or one of the fingers 158 of its respective assembly. The spring 162 exerts a force on its respective finger assembly at a point spaced inwardly from the center line of the respective shaft 154, 156 so as to bias the tips of the fingers upwardly or inwardly towards the vertical center line of the magazine 136. Only one of the springs 162 is shown in FIG. 3 in conjunction with the finger assembly 152. The other spring 162 (not illustrated) would of course extend from its respective bracket 148 to the eye 165 provided on the finger assembly 150. As best seen in FIGS. 3 and 5, each finger 158 is formed with a camming surface 164 along its upper edge. The camming surfaces 164 are biased by spring 162 against lug support shaft 142. The ends of shaft 156 are connected by a U-shaped bracket 166 while the ends of shaft 154 are connected by a U-shaped bracket 168. Centrally positioned between brackets 166 and 168 are a pair of pinion gears 170. The pinion gears are rotatably supported by support plates 144. A pair of gear racks 172 are secured to opposite ends of bracket 168 and extend toward bracket 166. The teeth formed on gear racks 172 engage pinion gears 170. In like manner, a pair of gear racks 174 extend from bracket 166 toward bracket 168, with the teeth on each gear rack 174 engaging pinion gears 170. As best seen in FIG. 5, a piston cylinder assembly 176 is disposed between support plates 144. The piston rod 178 of piston cylinder assembly 176 is secured to bracket 168. As a result, upon actuation of piston cylinder assembly 176, brackets 168 and 166 and hence the denester assemblies 150 and 152 are reciprocated toward one another through the action of rackets 172 and 174 and pinion gears 170, and then return away from each other.

Figure 11:
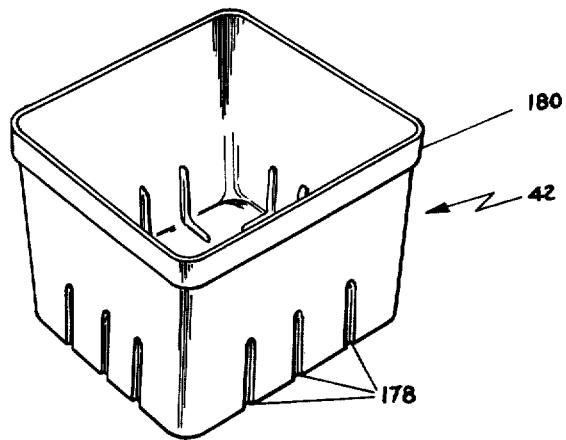
FIG. 11 is a perspective view of a produce container.
Figure 12:
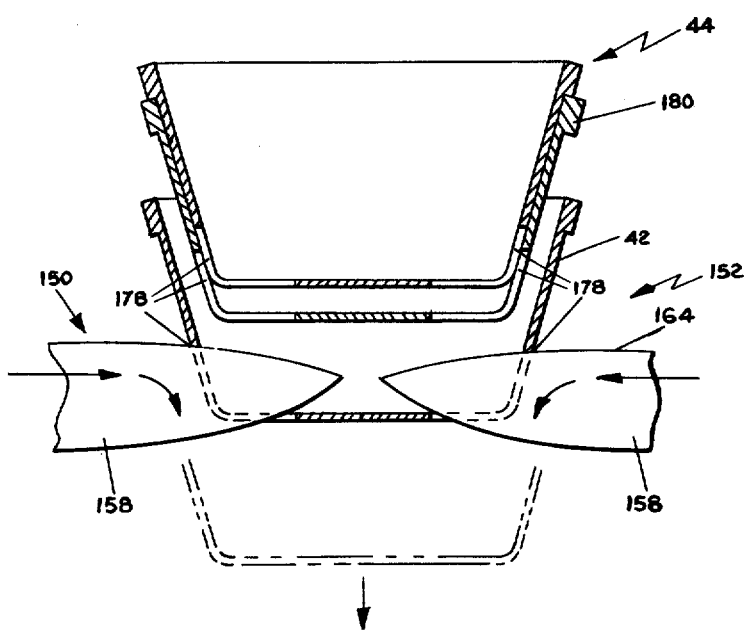
FIG. 12 is a fragmentary view in cross section, schematically illustrating the manner of operation of the denesting subassembly of the present invention.

As shown in FIG. 11, each berry box or produce container 42 is formed with a plurality of vertical slots 178. Each finger 158 is dimensioned so as to fit within vertical slots 178 of boxes 42. As schematically illustrated in FIG. 12, as denester finger assemblies 150 and 152 are advanced toward one another, the tips of fingers 158 enter the slots on opposite sides of the box, and, due to the shape of camming surfaces 164, stack 44 of containers is initially pushed upwardly with respect to the lowermost container 42. The stack is pushed upwardly by engagement of the bottom surface of the next to the bottom container, over the contoured upper face of each lug 140, and the lowermost container 42 is then wedged downwardly and separated from the stack by the lower face of each finger against the inside bottom surface of the lowermost container. This wedging action is apparent from FIG. 3 wherein fingers 158 have rotated downwardly as each camming surface 164 engages its shaft 142. As the lowermost container 42 is separated and forced downwardly by fingers 158, lugs 140 are rotated inwardly under the action of springs 146 to again engage the upper rim 180 of the now lowermost container 42 of the stack 44. As fingers 158 are moved back to their initial starting positions they disengage from the container, thereby permitting the container 42 to drop down onto the conveyor 24 for transport to hopper 20.

Figure 6:
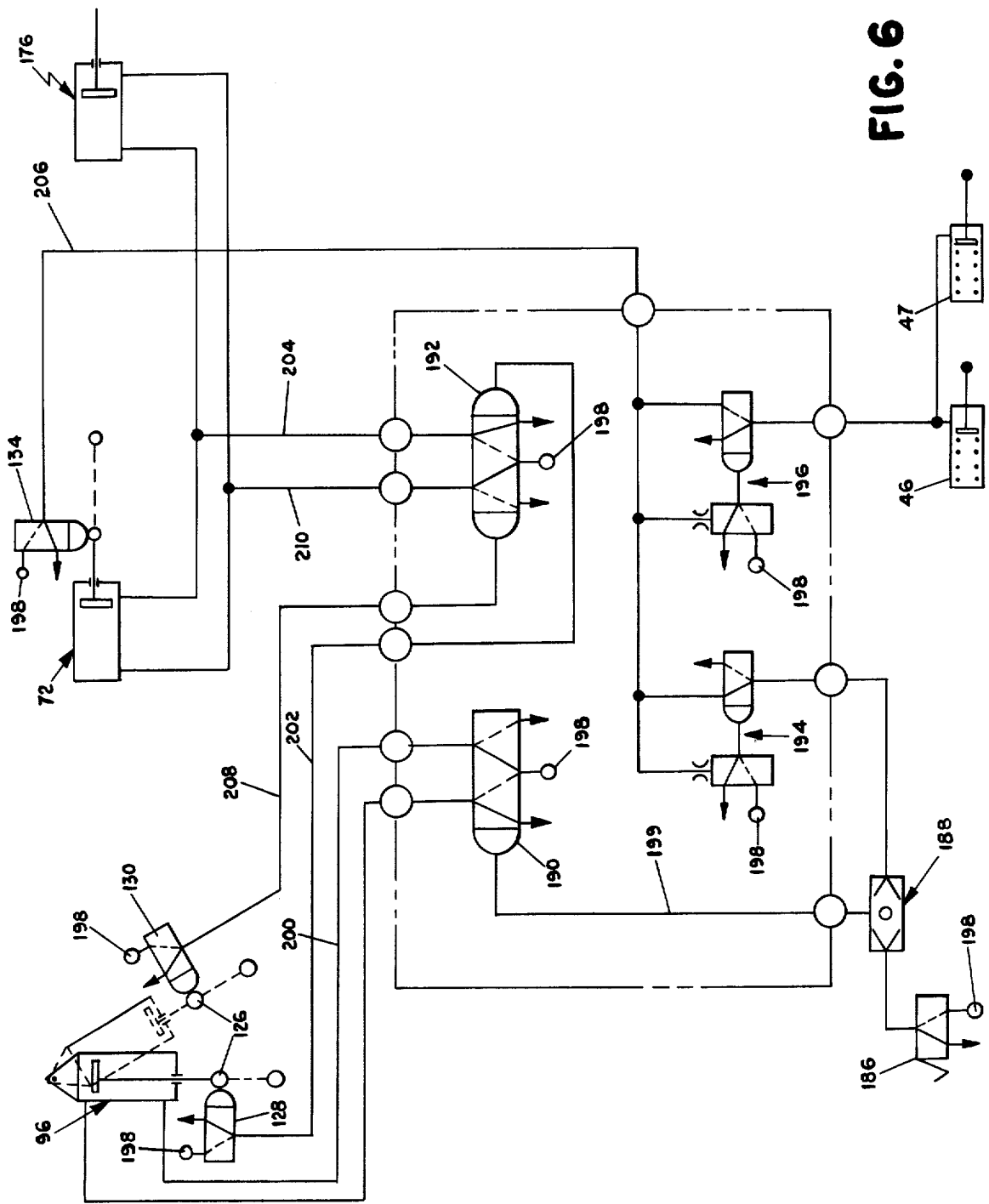
FIG. 6 is a schematic diagram of a control system for the packaging apparatus of the present invention.
Figure 8:
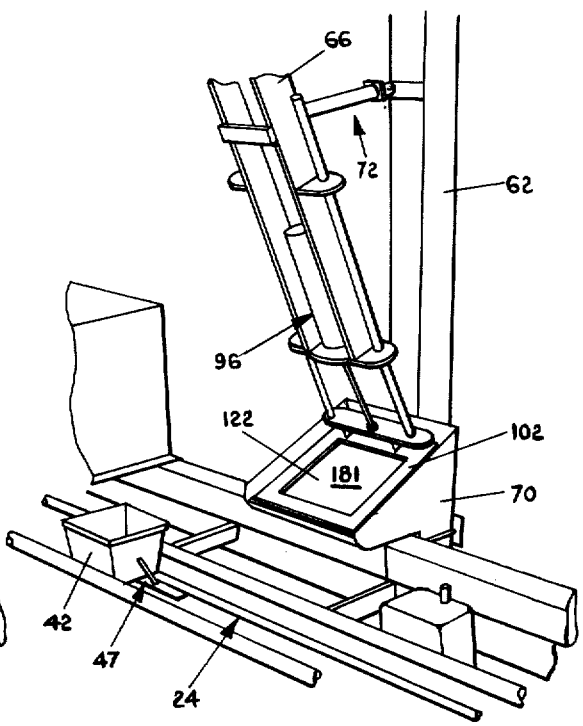

The operation of the overall packaging apparatus will now be more fully described. Initially, a plurality of boxes 42 are placed on conveyor 24, as shown in FIG. 1. The control system, as more fully described below with reference to FIG. 6, is activated and U-shaped covering support 66 is pivoted by piston cylinder assembly 72 to the flexible wrapper pick-up position (FIG. 7). Next, piston cylinder assembly 92 is activated to move rectangular wiper plate 90 downwardly toward the flexible wrappers retained within bin 70 (FIG. 8). Due to the angle which bin 70 assumes relative to the now pivoted support 66, the forward end of wiper plate 102 contacts uppermost wrapper 181 first. As piston cylinder assembly 92 retracts to its upward position, the rear end of wiper plate 102 is first to lift. This action in conjunction with a washer 182 supported on a shaft 184 insures separation of uppermost wrapper 181 from those remaining in the pile retained within box 70. The washer 182 is supported for reciprocating movement under the action of gravity on box 70. The washer imparts sufficient force to the edge of the flexible wrapper to insure separation of the uppermost wrapper from those remaining in the pile. The washer 182 merely rides on the shaft 184 which extends adjacent the transverse edge of each flexible wrapper in box 70 (FIGS. 2, 7, 9 and 10).

Figure 9:
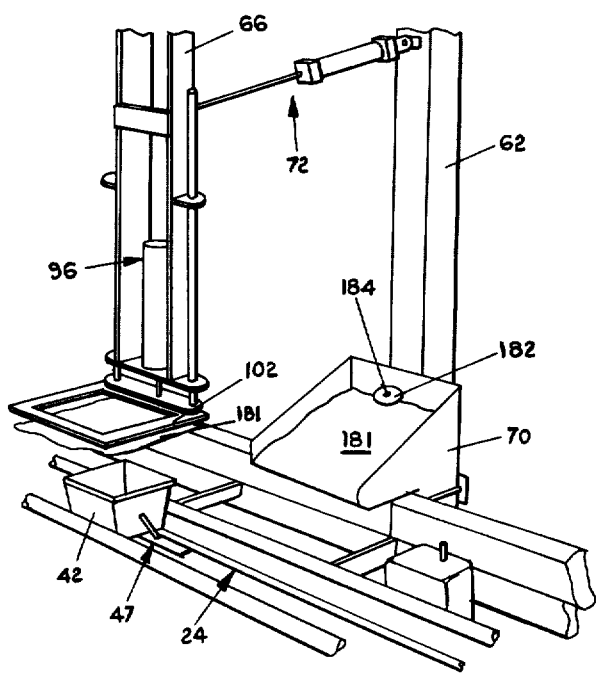
Figure 10:
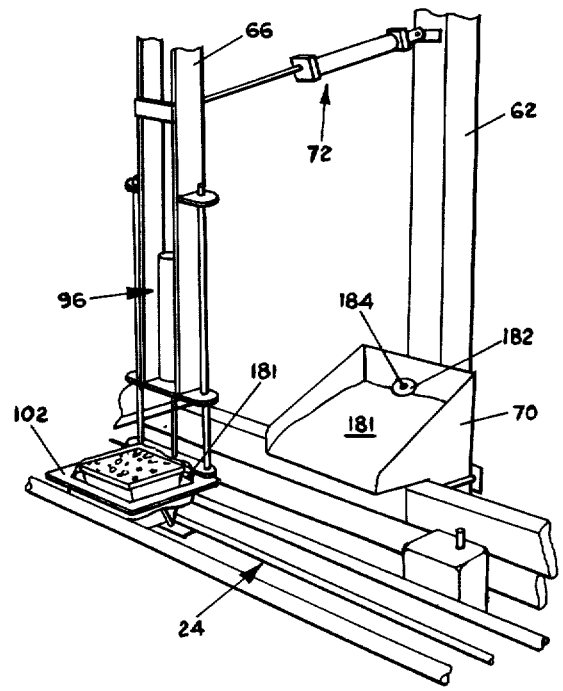

As piston cylinder 92 has completed its upward motion, block 126 contacts pneumatic switch 130 (FIG. 2), thereby activating the piston cylinder assembly 72 and pivoting support frame 66 in a forward direction (FIG. 9). During this action of support frame 66, piston cylinder 176 of denesting subassembly 18 is activated, depositing another container 42 on conveyor 24. Also, stop mechanisms 46 and 47 are reciprocated, permitting a single filled container 42 on a conveyor 24 to be transported to and stopped at a position directly beneath wiper plate 102 (FIG. 9).

When frame 66 has assumed a position directly over filled box 42, piston cylinder assembly 92 is again actuated and wiper plate 102 is moved downwardly, thereby wiping the flexible wrapper 181 over and around the periphery of the filled container 42. Due to the pivotal connection between wiper plate 102 and plate 106, the hands of an operator cannot be crushed between plate 102 and the main frame 12 during the downward movement of the plate. While the flexible wrapper 181 is retained around the box 42, an operator then bands the wrapper 181 to the box using a rubber band or the like. Actuation of a foot switch (not shown) by an operator then activates piston cylinder assembly 92, moving wiper 102 in an upward direction until block 126 contacts switch 128 (FIG. 2), thereby starting the automatic cycling of the apparatus.

A suitable control system to accomplish the semiautomatic operation of the packaging apparatus described above is schematically illustrated in FIG. 6. The system includes a foot actuated pneumatic switch 186, a shuttle valve 188, a spool valve 190 for actuating the piston cylinder assembly 92, a spool valve 192 for actuating the piston cylinder assemblies 72 and 176 and a pair of timer assemblies 194 and 196. Foot switch 186, switches 128, 130, 134, spool valves 190 and 192 and timers 194 and 196 are all connected to a source of compressed air 198. As is readily apparent from FIG. 6, upon actuation of foot switch 186, compressed air passes through shuttle valve 188 and line 199 to spool 190 which is thereby shifted. This permits compressed air to pass through line 200 to piston cylinder assembly 92, thereby moving the wiper assembly upwardly until block 126 contacts the plunger of switch 128. Upon actuation of switch 128, compressed air is permitted to travel through line 202 to spool valve 192. This permits compressed air to pass through line 204 to piston cylinder assembly 72 and piston cylinder assembly 176. Thereby, frame 66 is pivoted to its flexible wrapper pick-up position and the denester assembly is actuated to deposit another box or container 42 onto the conveyor 24. When piston cylinder assembly 72 has fully pivoted frame 66, switch 134 is activated and compressed air then passes through line 206 to timer assemblies 194, 196 and stop mechanisms 46 and 47. The piston cylinder assembly 92 is again reciprocated and a flexible wrapper is picked up. When block 126 contacts the plunger of the switch 130, pressurized air passes through line 208 to the spool valve 192, thereby permitting compressed air to pass through line 210 to piston cylinder assemblies 72 and 176 thereby returning frame 66 to its wiping position over a filled container 42. The timer mechanism 194 now permits compressed air to pass through shuttle valve 188 to spool valve 190. The piston cylinder assembly 92 is again actuated and wiper assembly 90 is moved downwardly, thereby wiping the flexible wrapper over the berries and around the periphery of box 42. The operator then bands the wrapper to the box using a rubber band or the like. Upon actuation of foot switch 186, the cycle is again commenced.

Various other control arrangements may be employed with the present apparatus, the primary consideration of course being the proper sequence of operation of each component of the packaging apparatus. As is readily apparent, the packaging apparatus of the present invention permits rapid and efficient packaging of berries or other produce in individual containers. The problems heretofore experienced with separation of containers from the stack as well as delays in the packaging operation are substantially eliminated. The foregoing description is illustrative of the preferred embodiment only. The true spirit and scope of the present invention will be determined by referring to the appended claims.

The embodiments of the invention in which an exclusive property or privilege is claimed are defined as follows:

1. An apparatus for packaging produce such as berries and the like in a slotted container, comprising:
    a main support frame;
    a conveyor mounted on and extending the length of said support frame;
    a stack retaining and denesting means mounted at one end of said main support frame above said conveyor for retaining a stack of the slotted containers and for separating the lowermost container of the stack and depositing the container on the conveyor;
    a dispenser mounted above said conveyor and spaced from said denesting means, said dispenser adapted to fill each container positioned on said conveyor with produce;
    a cover wiping means supported above and adjacent said conveyor and spaced from said dispenser for wiping a wrapper down and around a filled container, said stack retaining and denesting means comprising:
    a pair of spaced support members;
    a magazine secured to said spaced support members for retaining a vertical stack of bottom corner-slotted containers, said magazine having an open bottom exposing the lower portion of the lowermost container in the stack; separating means supported on said support members for reciprocating movement for lifting the stack of containers from the lowermost container and depressing the lowermost container away from the remainder of the stack to separate it and deposit the container on said conveyor, wherein said magazine further includes rim engagement lugs pivotally supported relative to said magazine and said stack of containers, said lugs engageable with the top rim of the bottom container of the stack; and
    means biasing said lugs to a stack retention position, said lugs being shiftable against the bias of said biasing means to a container release position by depressing the lowermost container and raising the stack of containers with said separating means.

2. An apparatus as defined by claim 1 wherein said separating means includes a pair of oppositely positioned, denesting finger assemblies, each of said finger assemblies including a plurality of shaped fingers, said assemblies operatively connected for reciprocating movement so that said fingers enter the slots of the containers.

3. An apparatus as defined by claim 2 further including a pinion gear rotatably supported on one of said support members;
    a pair of gear racks, one of which is connected to one of said finger assemblies, the other of which is connected to the other finger assembly, said gear racks engaging said pinion gear at diametrically opposed points thereof whereby longitudinal reciprocating movement of one of said finger assemblies results in oppositely directed reciprocating movement of the other of said finger assemblies.

4. An apparatus as defined by claim 3 further including cam followers extending between said support members; and
    means connected between said finger assemblies and said magazine for biasing said finger assemblies against said cam followers, said fingers having a camming surface riding on said cam followers whereby upon reciprocation of said finger assemblies, the lowermost container of said stack of containers is separated and deposited on said conveyor.

5. An apparatus for packaging produce such as berries and the like in a slotted container, comprising:
    a main support frame;
    a conveyer mounted on and extending the length of said support frame;
    a stack retaining and denesting means mounted at one end of said main support frame above said conveyer for retaining a stack of the slotted containers and for separating the lowermost container of the stack and depositing the container on the conveyor;
    a dispenser mounted above said conveyor and spaced from said denesting means, said dispenser adapted to fill each container positioned on said conveyer with produce;
    a cover wiping means supported above and adjacent said conveyer and spaced from said dispenser for wiping a wrapper down and around a filled container, said cover wiping means comprises:
- a cover holder for containing a supply of covers disposed adjacent said conveyer;
- a cover pick-up and applicator means mounted for movement between said cover holder and a position above a filled container disposed on said conveyer, said pick-up and applicator means including means for temporarily retaining the cover thereon and means for peripherally placing the cover around the outer periphery of the container;
- first power means operatively connected to said pick-up and applicator means for shifting said pick-up and applicator means between said cover holder and said conveyer;
- second power means operatively connected to said pick-up and applicator means for shifting said cover pick-up and applicator means down around the outer periphery of the container; and wherein said cover pick-up and applicator means includes a wiper plate having a rectangular central opening matching the container configuration and wherein said means for temporarily retaining a cover thereon includes said plate having internal passages terminating in openings at the undersurface of said plate, said openings being in communication with a vacuum source.

6. An apparatus as defined by claim 5 wherein said cover pick-up and applicator means further includes a yoke support fixably positioned above said main frame; a U-shaped support member pivotally connected to said yoke support and operatively connected to said first power means;
- a pair of rods mounted to said U-shaped support for longitudinal movement with respect to said U-shaped support;
- a support plate connected between said rods, said applicator plate operatively connected to said support plate for limited pivotal movement; and
- biasing means secured between said support plate and said applicator plate for biasing said applicator plate to a position parallel to the upper surface of the container, said second power means operatively connected to said support plate.

7. An apparatus as defined by claim 6 wherein said cover holder is mounted on an angle with respect to said conveyor so that when the U-shaped support arm is in the cover pick-up position and said second power means is actuated, the forward end of the applicator plate contacts the uppermost cover disposed in said cover holder before the rear end of the applicator plate.

8. An apparatus as defined by claim 7 further including a weight slidably mounted to said wrapper holder adjacent one edge thereof for movement in a plane perpendicular to said cover holder, said weight resting on an edge of a cover disposed within said holder.

9. An apparatus as defined by claim 5, further including a control system means operatively associated with said first power means and said second power means for semiautomatically actuating said first and said second power means.

10. An apparatus as defined by claim 9, wherein said control system means includes:
- a pair of switches mounted on said yoke;
- a spring disposed on the top of one of said rods;
- a block secured to the top of said spring; and
- a guard secured to said yoke, said switches, and said guard positioned so that said block alternately actuates one of said switches during operation of said first and said second power means.

11. A cover pick-up and applicator assembly for picking up and wiping a flexible cover over a filled container, comprising:
- a container support;
- a cover holder disposed adjacent said container support containing a supply of covers;
- a cover pick-up and applicator means mounted for movement between said cover holder and a position above a filled container disposed on said container support, said pick-up and applicator means including means for temporarily retaining the cover thereon and means for peripherally placing the cover around the outer periphery of the container;
- first power means operatively connected to said pick-up and applicator means for shifting said pick-up and applicator means between said cover holder and said container support;
- second power means operatively connected to said pick-up and applicator means for shifting said cover pick-up and applicator means down around the outer periphery of the container; and wherein said cover pick-up and applicator means includes a wiper plate having a rectangular central opening matching the container configuration and wherein said means for temporarily retaining a cover thereon includes said plate having internal passages terminating in openings at the undersurface of said plate, said openings being in communication with a vacuum source.

12. An apparatus as defined by claim 11 wherein said cover pick-up and applicator means further includes a yoke support fixably positioned above said container support;
- a U-shaped support member pivotally connected to said yoke support and operatively connected to said first power means;
- a pair of rods mounted to said U-shaped support for longitudinal movement with respect to said U-shaped support;
- a support plate connected between said rods, said applicator plate operatively connected to said support plate for limited pivotal movement; and
- biasing means secured between said support plate and said applicator plate for biasing said applicator plate to a position parallel to the upper surface of the container, said second power means operatively connected to said support plate.

13. An apparatus as defined by claim 12 wherein said cover holder is mounted on an angle with respect to said container support so that when the U-shaped support arm is in the cover pick-up position and said second power means is actuated, the forward end of the applicator plate contacts the uppermost cover contained in said cover holder before the rear end of the applicator plate.

14. An apparatus as defined by claim 13 further including a weight slidably mounted to said cover holder adjacent one edge thereof for movement in a plane perpendicular to said wrapper holder, said weight resting on an edge of a cover disposed within said holder.

15. An apparatus as defined by claim 14, further including a control system means operatively associated with said first power means and said second power means for semiautomatically actuating said first and said second power means.

16. An apparatus as defined by claim 15, wherein said control system means includes:
- a pair of switches mounted on said yoke;
- a spring disposed on the top of one of said rods;
- a block secured to the top of said spring; and
- a guard secured to said yoke, said switches and said guard positioned so that said block alternately actuates one of said switches during operation of said first and said second power means.

* * * * *